Oct. 27, 1931.  R. KANIA  1,828,806
SANITARY COOKING VESSEL
Filed Feb. 5, 1930   4 Sheets-Sheet 3
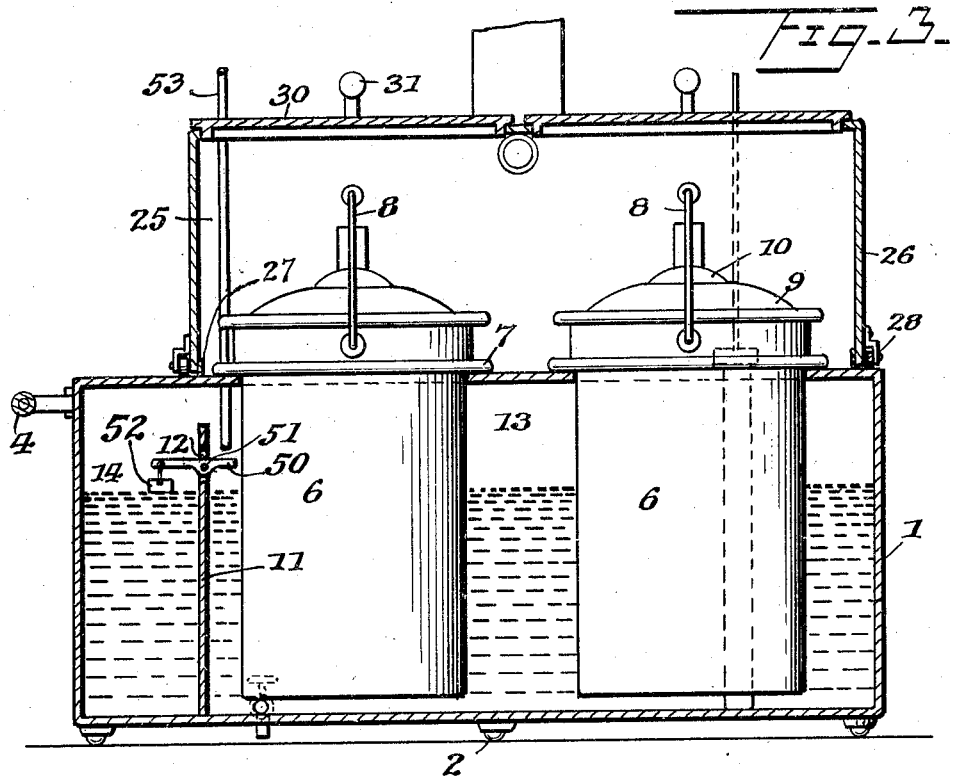
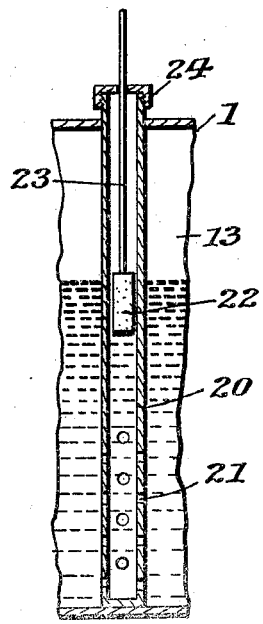
Inventor
Rudolph Kania
By Jacobi & Jacobi
Attorneys

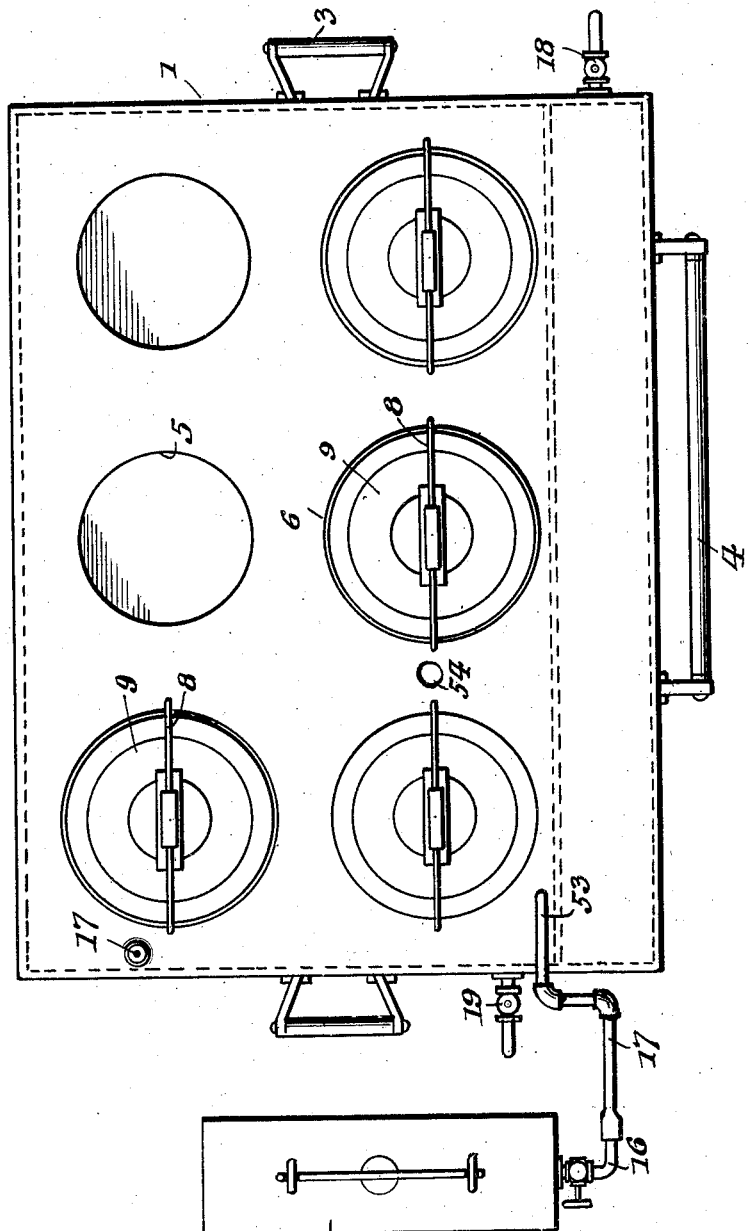

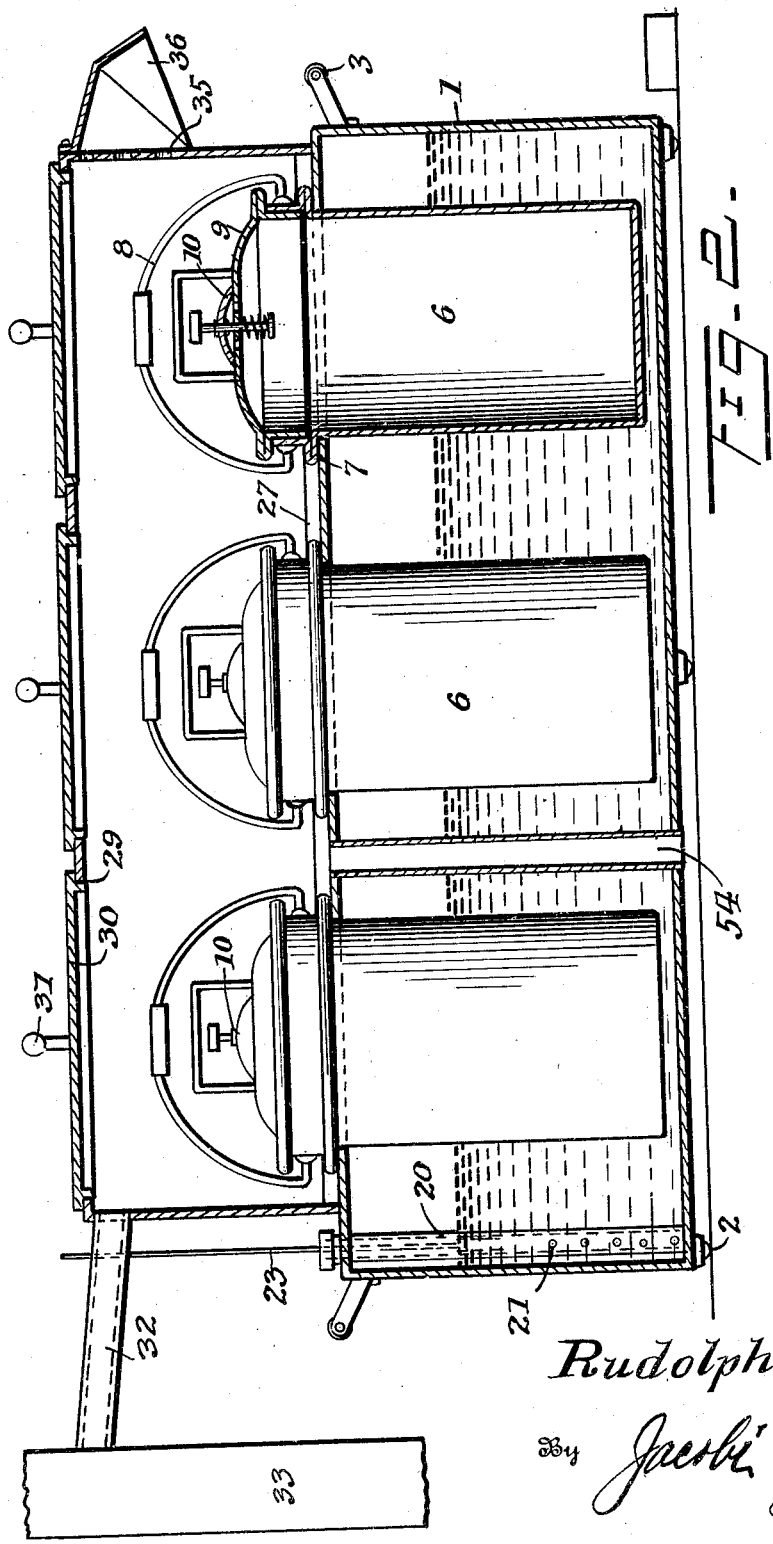

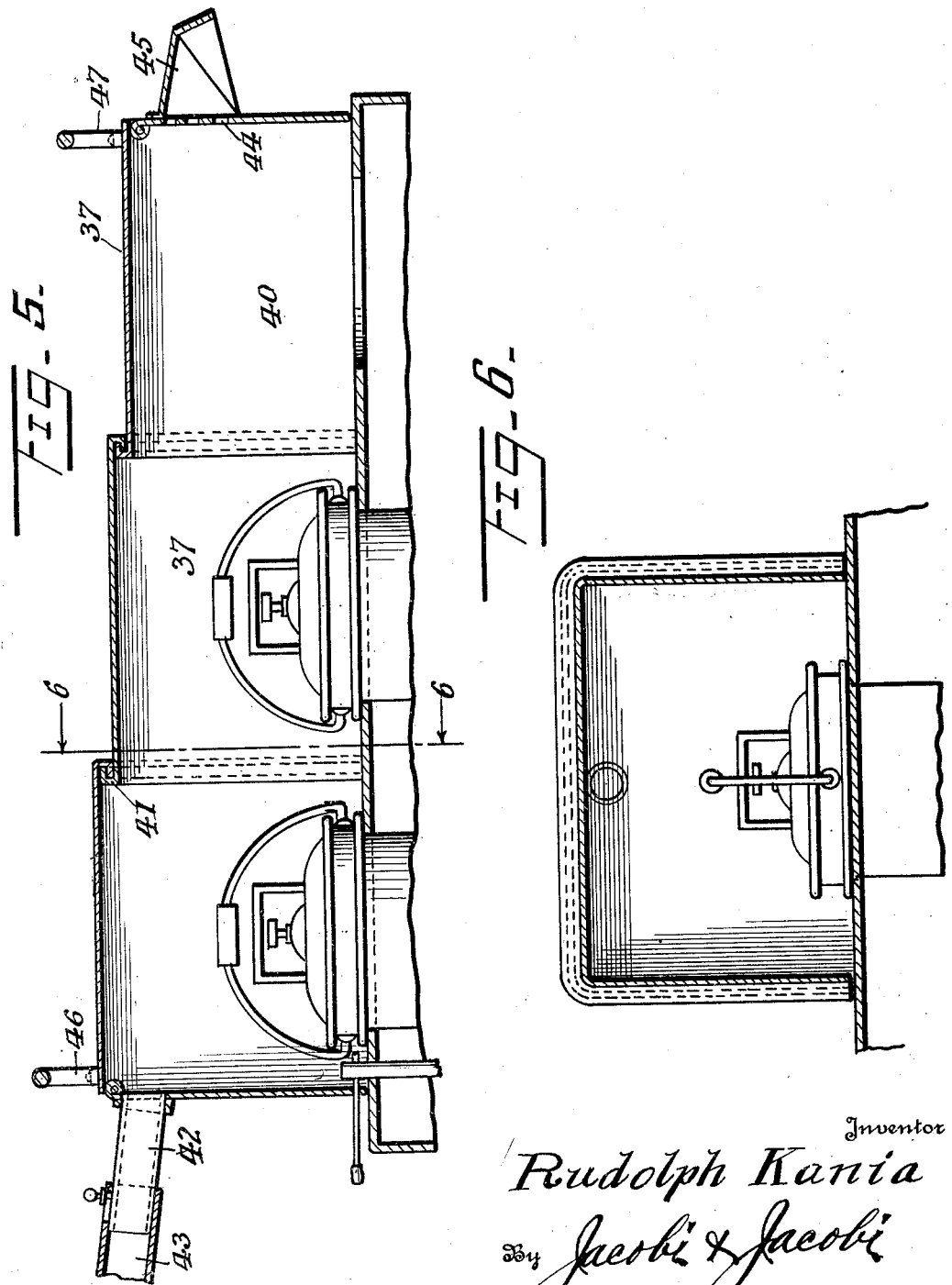

Patented Oct. 27, 1931

1,828,806

UNITED STATES PATENT OFFICE

RUDOLPH KANIA, OF BOWERS HILL, VIRGINIA, ASSIGNOR OF FIFTY PER CENT TO ANTONY URAYASZ, OF BOWERS HILL, VIRGINIA

SANITARY COOKING VESSEL

Application filed February 5, 1930. Serial No. 426,128.

The present invention relates to improvements in cookers, and has for its principal object to provide a cooking vessel that includes a water receptacle for disposition on top of the stove, the top of the water receptacle having a series of cooking vessel receiving openings formed therein so as to accommodate a plurality of cooking vessels whereby the cooking of different foods may be accomplished at the same time in a positive and efficient yet expeditious manner.

Another important object of the invention is to provide a cooking vessel wherein a vapor chamber is positioned above the top of the water receptacle, a pipe leading from the vapor chamber to the smoke flue for conducting off the vapors rising upwardly through the cooker.

A still further object is to provide a structure of the above mentioned character wherein the parts are so constructed as to permit the same to be readily and easily assembled and disassembled, additional means being provided for replenishing the water supply to the receptacle whenever necessary and this in an automatic manner.

A still further object is to provide a sanitary cooking vessel of the above mentioned character wherein the vapor chamber includes a movable hood structure, the latter being provided at one end with an auxiliary hood for disposition over a frying pan or the like so that the smoke will be caused to pass through the vapor chamber, and finally out into the smoke flue, thus preventing the escape of the odors into the room.

Another object is to provide a sanitary cooking vessel of the above mentioned character which is simple in construction, inexpensive, strong and durable and further well adapted to the purpose for which it is designed.

Other objects and advantages of the invention will become apparent from the following description when taken in connection with the accompanying drawings.

In the accompanying drawings wherein like reference characters indicate corresponding parts throughout the several views:

Figure 1 is a top plan view of the sanitary cooking vessel embodying my invention, the vapor chamber being omitted.

Figure 2 is a longitudinal vertical sectional view through the water receptacle and the vapor chamber showing the cooking vessels arranged within the water receptacle.

Figure 3 is a vertical cross sectional view through the structure.

Figure 4 is a detail of the gage associated with the water receptacle.

Figure 5 is a longitudinal sectional view through a slightly modified form of hood structure for the vapor chamber, and Figure 6 is a vertical sectional view taken approximately on the line 6—6 of Figure 5 looking in the direction of the arrows.

In the drawings wherein for the purpose of illustration is shown the preferred embodiment of my invention, and with reference more particularly to Figures 1 to 5, inclusive, the numeral 1 designates a substantially rectangular shaped closed water receptacle that is constructed of sheet metal. Ball bearing casters 2 are arranged on the bottom of the receptacle to facilitate ready and easy movement of the water receptacle across the top of a stove, not shown. Suitable handles 3 extend from the opposite ends of the receptacle while secured on one side of the receptacle is an elongated roller 4 that constitutes a towel rack.

The top of the receptacle 1 is formed with a series of spaced cooking vessel receiving openings denoted by the numeral 5 and in Figure 2 of the drawings, there is clearly illustrated the manner in which the cooking vessels are disposed through the openings 5 for disposition within the receptacle 1. Each of the cooking vessels is denoted by the numeral 6 and it will be observed that an annular flange 7 is formed adjacent the upper end of each vessel to provide a shoulder for engagement with the upper face of the top of the receptacle 1 so as to suspend the cooking vessel within the receptacle 1 with the lower end of the cooking vessel being maintained in spaced relation with respect to the bottom of the water receptacle.

A bail 8 is associated with the open end portion of each cooking vessel and a removable lid 9 is also associated with the upper open end of each cooking vessel in the manner well known in the art. A relief valve structure 10 is associated with each of the lids 9 for the purposes well known in the art.

A partition 11 is arranged vertically and longitudinally within the water receptacle 1 adjacent one side thereof and upon referring to Figure 3 of the drawings it will be observed that this partition 11 is provided adjacent its upper edge with an opening 12. The upper edge of the partition terminates below the top of the receptacle. The partition 11 divides the receptacle 1 into a relatively large cooking water chamber 13 and a much smaller clean water chamber 14.

A trough 50 is mounted for rocking movement on the pivot 51 in the opening 12. The inner end of the trough extends into the cooking water chamber 13 while the outer end extends into the chamber 14 and has attached thereto the cork float 52.

A supply pipe 53 extends vertically through the top of the chamber 13, the lower end thereof being disposed directly over the inner end portion of the trough 50.

A water tank 15 is supported in any appropriate manner near the cooking vessel. A valved outlet pipe 16 extends from the tank 15 and a hose 17 affords an operative connection between the discharge pipe 16 and the upper end of the supply pipe 53. This construction provides a means whereby the water will be discharged into the trough 50 and as soon as the compartment 14 is filled to the proper height the pivotally mounted trough 50 will assume such a position as to permit the flow of water into the chamber 13. The pivoted trough will thus act as an automatic float actuated valve, and a predetermined amount of water will be maintained in the chamber 14 at all times.

A spigot 18 extends from one end of the auxiliary compartment or chamber 14 adjacent the bottom thereof, a similar spigot 19 extending from the opposite end of the main chamber 13 adjacent the bottom thereof.

A gage is associated with the main chamber 13, and this gage includes a vertically disposed cylinder 20 that is formed at vertically spaced points with the openings 21 and operable within this cylinder 20 is the float 22 secured on the lower end of a rod 23. This rod is slidably disposed through an opening provided therefor in the cap 24 that is secured on the projecting upper end of the cylinder 20. The rod 23 constitutes the gage element whereby a person can readily ascertain just how much water there is in the container 1.

When the cooking vessels 6 are disposed through the openings 5 within the main chamber 13 of the water receptacle 1, the water will be heated by the stove on top of which the cooker is disposed and the hot water will in turn cook the contents of the vessels 6 and at the same time prevent the food from coming in contact with the water in the receptacle 1.

For the purpose of conducting off the vapors rising upwardly from the cooking vessels, there is provided on the top of the receptacle, a vapor chamber denoted generally by the numeral 25. This vapor chamber comprises a rectangular shaped shell 26 that is open at its top and bottom as shown more clearly in Figures 2 and 3. Upstanding track forming flanges 27 are arranged on the top of the receptacle 1 in a longitudinal manner and the side walls of the shell 26 abut against the outer faces of the respective flanges as also shown very clearly in Figure 3. In addition, rollers 28 are carried by the side walls of the shell for rolling engagement with the upper face of the water receptacle 1 whereby to facilitate the sliding movement of the shell 26 across the top of the water receptacle.

The openings 29 formed in the top of the shell 26 are relatively large and are disposed in such a manner as to be positioned over the respective cooking vessels supported within the receptacle 1 and removable lids 30 are provided for the openings 29. The handle for each lid is shown at 31.

A vapor conducting pipe 32 extends from one end of the shell 26 and has communication with the smoke flue 33.

A pipe 54 also extends vertically through the water receptacle 1 through which the foul air in the vapor chamber 25 may pass downwardly.

The opposite end of the shell 26 is formed with a series of openings 35, and secured to the outer face of this end of the shell for disposition adjacent the openings is the downwardly directed hood 36, the same being provided for the purpose of permitting the smoke that rises upwardly from the frying pan occupying a position on the stove adjacent the receptacle 1 to pass through the openings 35 into the chamber 25, and then be discharged through the pipe 32 into the smoke flue 33.

In Figure 5 of the drawings, I have shown a modification of the vapor chamber wherein the same is of sectional construction. In the present instance, the sectional vapor chamber 37 consists of three complementary sections, the same being designated by the numerals 38, 39, and 40, respectively. These sections gradually vary in size so as to provide a telescopic structure and the adjacent open ends of the complementary sections are formed with interfitting flanges 41.

The larger section 38 has a vapor pipe 42 extending from the closed end thereof, whereby the vapors can be discharged into the pipe 43 that has communication with the smoke flue, not shown, and it will be observed upon referring to Figure 5 that the adjacent ends of the pipe 42 and 43 are adjustably secured together. The opposite end of the larger section 38 is open as is also the inner end of the smaller section 40 and the respective ends of the intermediate section 39 are open for cooperation with the adjacent open ends of the smaller and larger sections, respectively.

The outer end of the smaller section 40 is formed with the openings 44 provided for the same purpose as the openings 35, and the hood 45 is associated with the opening 44.

A handle 46 is secured on the top of the outer end portion of the larger section 38. A similar handle 47 is secured on the top of the outer end portion of the smaller section 40 whereby to permit the sections to be collapsed or extended depending upon the size of the water receptacle with which the vapor chamber 37 is to be associated.

A structure of the above mentioned character will permit a large number of cooking vessels to be accommodated at one time so as to expedite the cooking of the food and in such a manner as to prevent the contents of the cooking vessels from becoming burnt. Furthermore, the water in the receptacle 1 cannot possibly enter the cooking vessel, and the provision of the vapor chamber on the top of the water receptacle will carry off any fumes or smoke so as to prevent the same from escaping out into the room. The simplicity of my device enables the parts to be readily and easily assembled or disassembled, and access to the cooking vessels may be had without difficulty.

While I have been shown the preferred embodiment of my invention, it is to be understood that minor changes in size, shape and arrangement of parts may be resorted to without departing from the spirit of the invention, and the scope of the appended claims.

Having thus described the invention, what I claim as new and desire to secure by Letters Patent is:—

1. In a structure of the class described, a water receptacle, a partition arranged vertically therein dividing the receptacle into independent chambers, said partition being formed with an opening in the upper portion thereof, a water trough rockably supported in the opening, the ends of the trough extending into the respective chambers, a water supply pipe having its discharge end disposed above one end of the pivoted trough, and a float attached to the other end of the trough as and for the purpose described.

2. In a structure of the class described, a closed water receptacle having a plurality of openings in the top thereof, cooking vessels for disposition through the openings, a vapor chamber arranged above the cooking vessels for carrying off the vapors rising upwardly therefrom, the bottom of the chamber being open and adapted to rest on the top of the water receptacle, a vapor discharge pipe extending from the upper portion of said chamber, the top of the chamber being formed with openings arranged in alinement with the respective openings in the top of the water receptacle, and removable covers for the openings in the top of the vapor chamber.

In testimony whereof I affix my signature.

RUDOLPH KANIA.